United States Patent [19]

Muan et al.

[11] Patent Number: 5,124,305
[45] Date of Patent: Jun. 23, 1992

[54] COMPOSITIONS INVOLVING FEO—$V_2O_3$—CAO

[75] Inventors: Arnulf Muan, Lacey Spring, Va.; Mitri S. Najjar, Wappingers Falls, N.Y.

[73] Assignee: Texaco, Inc., White Plains, N.Y.

[21] Appl. No.: 563,019

[22] Filed: Aug. 6, 1990

[51] Int. Cl.⁵ .......................... B01J 23/22; B01J 23/74; B01J 23/76; B01J 23/78
[52] U.S. Cl. ..................................... 502/338; 502/340; 502/353; 423/594
[58] Field of Search ................... 502/338, 340, 353; 423/594

[56] References Cited

U.S. PATENT DOCUMENTS

| | | | |
|---|---|---|---|
| 3,925,001 | 12/1975 | Salooja | 502/340 |
| 4,496,785 | 1/1985 | Miller et al. | 502/340 |
| 4,619,910 | 10/1986 | Dyer et al. | 502/332 |
| 4,977,130 | 12/1990 | Najjar et al. | 502/340 |

*Primary Examiner*—Anthony McFarlane
*Attorney, Agent, or Firm*—Robert A. Kulason; James J. O'Loughlin; Albert Brent

[57] ABSTRACT

The present invention pertains to novel phases involving FeO, $V_2O_3$ and CaO and the method for their preparation. The solid compositions involving FeO—$V_2O_3$—CaO fall within the shaded area of a polygon in a ternary composition diagram of FeO, $V_2O_3$ and CaO as shown in the drawing herein e.g., FIG. 1. The compositions may be used as a catalyst for oxidation or reduction reactions.

23 Claims, 1 Drawing Sheet

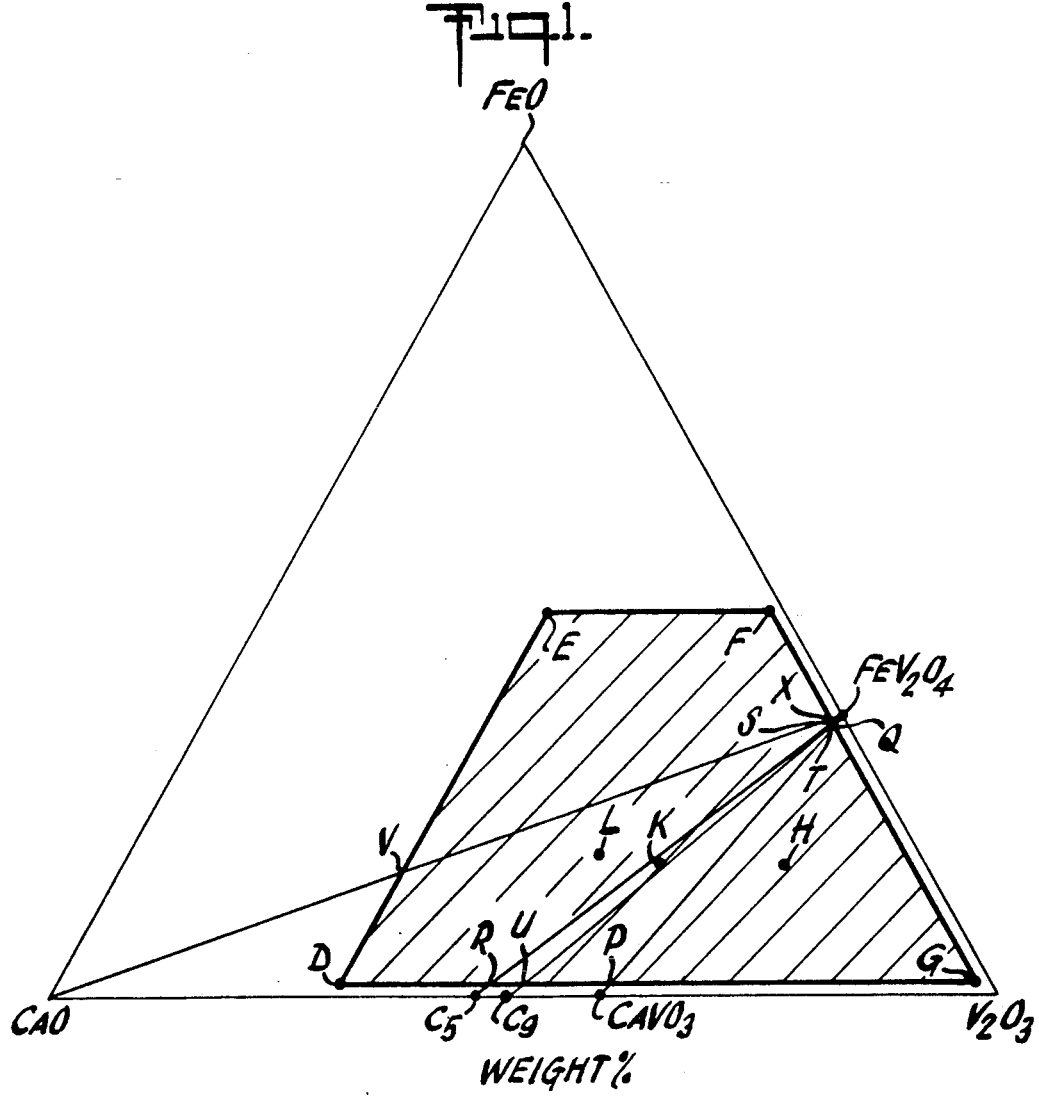

COMPOSITIONS INVOLVING FEO—V₂O₃—CAO

BACKGROUND OF THE INVENTION

Field of the Invention

This invention relates to compositions involving $FeO$—$V_2O_3$—$CaO$.

SUMMARY OF THE INVENTION

The present invention pertains to novel solid compositions involving FeO, $V_2O_3$ and CaO, and the method for their preparation. The solid compositions involving $FeO$—$V_2O_3$—$CaO$ fall within the shaded area of a polygon in a ternary composition diagram of FeO, $V_2O_3$ and CaO as shown in the drawing herein e.g. FIG. 1. The polygon has the vertices and corresponding coordinates in weight percent as shown in the following Table I.

TABLE I

| Vertices | Coordinates (wt %) | | |
|---|---|---|---|
| | FeO | $V_2O_3$ | CaO |
| D | 1 | 30 | 69 |
| E | 45 | 30 | 25 |
| F | 45 | 54 | 1 |
| G | 1 | 98 | 1 |

The compositions involving FeO, $V_2O_3$ and CaO are depicted by the polygon shaped shaded area circumscribed by DEFG as shown in FIG. 1. These novel solid compositions involving FeO, $V_2O_3$, and CaO are made by the process involving the steps of:

(1) heating $V_2O_5$ powder having a particle size of less than about 50 microns in an atmosphere in which the partial pressure of oxygen is in the range of $10^{-6}$ to $10^{-10}$ atmosphere while gradually increasing the temperature over a temperature range of about 600° C. to 1300° C., and holding the temperature at about 1300° C. for a period of at least about 24 hrs to complete reduction of all vanadium to $V^{3+}$;

(2) heating $Fe_2O_3$ powder having a particle size of less than about 50 microns for a period of 10 to 14 hrs. at a temperature in the range of about 1400° C. to 1450° C.; whereby substantially all of said $Fe_2O_3$ is converted into $Fe_3O_4$;

(3) heating $CaCO_3$ powder a particle size of less than about 50 microns for a period of about 10 to 14 hrs. at a temperature in the range of about 600° C. to 1100° C.; whereby substantially all of said $CaCO_3$ is converted into CaO.

(4) thoroughly grinding together about 30 to 98 wt. % of $V_2O_3$ from , with about 1 to 45 wt. % of $Fe_3O_4$ from (2), and about 1 to 69 wt. % of CaO from (3) to produce a mixture having a grain size of less than about 50 microns, (5) pelletizing the mixture from (4) at a pressure of about 5,000 psi; and (6) heating and reacting together the mixture of pellets from (5) at a temperature in the range of about 700° C. to 1500° C. for a period in the range of about 12 to 48 hrs., in an atmosphere in which the partial pressure of oxygen is in the range of $10^{-10}$ to $10^{-6}$ atmosphere to produce said compositions involving FeO, $V_2O_3$ and CaO.

In one embodiment, the pellets from step (6) are cooled to ambient temperature while at substantially the same partial pressure of oxygen as in step (6). Preferably, to prevent undue oxidation and moisture pickup, the cooled pellets are stored in a sealed container.

BRIEF DESCRIPTION OF THE DRAWING

The drawing e.g. FIG. 1 depicts a ternary composition diagram showing a polygon shaped shaded area circumscribed by DEFG within which useful compositions involving $FeO$—$V_2O_3$—$CaO$ are found.

DESCRIPTION OF THE INVENTION

The subject newly synthesized solid compositions involving $FeO$—$V_2O_3$—$CaO$ and mixtures thereof are depicted in FIG. 1. This work has led to synthesizing new phases in which vanadium in several oxidation states are accommodated such as to render crystalline phases thermodynamically stable over a wide range of oxygen pressures at elevated temperatures.

The newly synthesized solid compositions involving $FeO$—$V_2O_3$—$CaO$ are shown in the enclosed figure (drawing) as circumscribed by the polygon shaped shaded area DEFG in the ternary composition diagram. The oxidation states of vanadium in the newly solid compositions vary in the range of about +3 to +5.

The polygon shaped shaded area DEFG has the following vertices and corresponding coordinates in weight percent:

| Vertices | Coordinates (wt %) | | |
|---|---|---|---|
| | FeO | $V_2O_3$ | CaO |
| D | 1 | 30 | 69 |
| E | 45 | 30 | 25 |
| F | 45 | 54 | 1 |
| G | 1 | 98 | 1 |

Three stable intermediate phases designated $C_5$, $C_9$, and $CaVO_3$ are depicted in FIG. 1. $C_5$ is used herein to designate a complex calcium vanadate of the general formula $Ca_5V_3O_x$, where $X=9.5-12.5$. $C_5$ is used herein to designate a complex calcium vanadate of the general formula $Ca_9V_6O_x$, where $X=18-24$.

A typical newly synthesized material involving the phases $FeO$—$V_2O_3$—$CaO$ exist within that portion of the area of composition triangle $CaVO_3$—$V_2O_3$—$FeV_2O_4$ that falls within polygon DEFG, as shown in FIG. 1, wherein said portion of common area is a triangle circumscribed by PQG. This composition is illustrated by point H in the drawing, e.g. FIG. 1. Point H in FIG. 1 has the following coordinates in wt. %: FeO 15, $V_2O_3$ 70, and CaO 15. The onset of partial melting of this composition is in the range of about 1075°–1125° C. Higher melting mixtures having an onset of partial melting in the range of about 1300°–1350° C. are found within that portion of composition triangle $C_5$—$FeV_2O_4$—$C_9$ that falls within polygon DEFG, as shown in FIG. 1, wherein said portion of common area is a polygon circumscribed by R-S-T-U. The composition of a typical mixture that falls within this area is represented by point K in FIG. 1. Point K has the following coordinates in wt. % FeO 15, $V_2O_3$ 57 and CaO 28. Other high melting solid solutions having an onset of partial melting in the range of about 1300°–1350° C. are found, Within that portion of composition triangle CaO—$FeV_2O_4$—$C_5$ that falls within polygon DEFG as shown in FIG. 1, wherein said portion of common area is a polygon circumscribed by DVXSR. The compositions of a typical mixture that falls within this area is represented by point L in FIG. 1. Point L has the following coordinates in wt. % FeO 17, $V_2O_3$ 50, and CaO 33. In FIG. 1, line FG is intersected by line CaO—$FeV_2O_4$ at point X, by line $C_5$—$FeV_2O_4$ at point S, by line $C_9$—$FeV_2O_4$ at point T, and by line $CaVO_3$—$FeV_2O_4$ at point Q.

The subject compositions made from FeO, $V_2O_3$ and CaO are synthesized in the following manner. The identity of the reaction product, stable solid phases involving FeO—$V_2O_3$—CaO, may be confirmed by X-ray diffraction analysis.

First, $V_2O_3$ is prepared by heating commercially available analytical-grade $V_2O_5$ having a particle size of less than about 50 microns in a vertical tube furnace in an atmosphere of carefully selected oxygen pressure within the stability range of $V_2O_3$ e.g. in the range of $10^{-6}$ to $10^{-10}$ atmospheres. This is accomplished by using a gas mixture of H high-purity e.g. 99.9 mole % or more $CO_2$ and $H_2$ or $CO_2$ and CO or $H_2O$ and $H_2$ in controlled proportions. The $CO_2/H_2$, $CO_2/CO$ or $H_2O/H_2$ ratio by volume is in the range of 10/1 to 1/1. The relatively low melting point of the starting vanadium oxide ($V_2O_5$) e.g. about 690° C., necessitates heating the oxide slowly. Starting at a temperature of about 600° C., the temperature is gradually increased over a period of about 12 to 24 hrs. to a final temperature of about 1300° C. At a temperature of about 1300° C. the vanadium oxide is held at least about 24 hrs e.g. about 24 to 30 hrs., to ensure complete reduction of all vanadium to $V^{3+}$.

Preheated analytical-grade oxides having a particle size of less than about 50 microns are used as starting materials for the other components of the stable phases to be synthesized. The $CaCO_3$ is heated for about 10 to 14 hrs. at a temperature in the range of about 600° C. to 1100° C. prior to being used in preparations of these final materials. By this H means, substantially all, i.e. more than 95 wt. % of the $CaCO_3$ is converted into CaO. $Fe_2O_3$ is heated for about 10 to 14 hrs. at a temperature in the range of about 1400° C. to 1450° C. prior to being used in preparation of the final mixtures. By this means, substantially all i.e. more than 95 wt. % of the $Fe_2O_3$ is converted into $Fe_3O_4$. Simultaneously, the oxides are demoisturized. They may be then cooled to ambient conditions.

The mixtures of the three oxide components are thoroughly mechanically ground together under acetone in an agate mortar to ensure thorough mixing and a sufficiently small grain size e.g. less than 50 microns. For example about 30 to 98 wt. % of $V_2O_3$ is ground together with about 1 to 45, wt. % of $Fe_3O_4$ and about 1 to 69 wt. % of CaO to produce a mixture having a grain size of less than about 50 microns. Complete formation of the desired compounds in the succeeding heat treatment is thereby promoted. Next, the oxide mixtures are pelletized at a pressure of about 5,000 psi or higher. The pellets may have any conventional size e.g. 1/16" to 1". The mixture of pellets are then heated and reacted together at a temperature in the range of about 700° C. to 1500° C. for a period in the range of about 12 to 48 hrs. (depending on the nature and solidus temperature of the phase to be synthesized) in a vertical tube furnace with carefully controlled oxygen pressures, in the range of $10^{-10}$ to $10^{-6}$ atmosphere. In the manner described previously for preparing $V_2O_3$, the pellets are heated in a furnace atmosphere provided by a gas mixture of $CO_2$ and $H_2$ or $CO_2$ and CO or $H_2O$ and $H_2$ in various desired volumetric mixing ratios. For example, the volumetric ratio $CO_2/H_2$, $CO_2/CO$, or $H_2O/H_2$ is typically in the range of about 10/1 to 1/1. These selected ratios are kept constant for the duration of the synthesis by use of a differential manometer. By this method the oxygen pressure at the specified temperature can be controlled to better than ±1%. The thermodynamic data for the water-gas shift reaction ($CO_2+H_2=CO+H_2O$), on which the calculations were based, are known with extremely high accuracy (better than 0.1%). Hence, the method used herein ensures reliable accurate control of the oxidation state of vanadium during the synthesis. This is extremely important for optimization of the properties of the finished product.

At the time of the high temperature reaction in the range of about 700° C. to 1500° C., all of the oxide pellets may be in the solid state or at least one, two or three of the oxide constituents may be in the molten state. At the reaction conditions prevailing in the subject process, solid solutions may be made by solid-state reactions considerably below temperatures at which a liquid phase is present. However, the presence of a liquid phase or a solid-liquid phase improves the kinetics of the reaction.

The individual oxide components are heated to a sufficiently high temperature to expel absorbed or adsorbed water. Well defined starting materials for accurately weighing up mixtures is thereby produced. As previously described, $V_2O_5$ was heated slowly to a temperature of about 1300° C. at controlled oxygen pressures in order to decompose the $V_2O_5$ slowly to $V_2O_3$. By this means, violent reactions are avoided at the highest temperatures, and the vanadium is produced in the desired oxidation state $V^{3+}$.

The oxide mixtures were heated at temperatures in the range of about 700°-1500° C. in order to promote reaction among the oxide components to the desired finished products consisting mainly of one or more (solid-solution) phases. In one embodiment, the mixture of solid particles was heated to a temperature below the solidus, for example to about 1000° C. The phase assemblage of the final product was produced entirely by solid state reaction. Under such conditions, the reaction products were relatively small, typically, of about 0-5.0 microns. In another embodiment, the mixtures were heated to a sufficiently high temperature e.g. about 1500° C. to produce partial or complete melting. This speeds up the reaction and produces reaction products of larger size, typically in the range of about 2-75 microns. After heating the mixtures at this high temperature for a period of time, such as 12-48 hrs., the composition is cooled to ambient conditions. For example, the composition may be cooled slowly (over a period of ½-1 hr) to about 1200° C. From this temperature, the composition may be cooled rapidly (quenched) to room temperature. During these runs the oxygen pressure of the gas phase was controlled by using gas mixtures of $CO_2$ are $H_2$, $CO_2$ and CO, or $H_2O$ and $H_z$ with volumetric ratios $CO_2/H_2$, $CO_2/CO$ or $H_2O/H_2$ in the range of about 10/1-1/1. These selected ratios are kept constant for the duration of the synthesis, for example, by use of a differential manometer.

The new solid compositions that have been synthesized imposed by a $CO_2$-$H_2$ atmosphere with a $CO_2/H_2$ volume ratio that provides a controlled partial pressure of oxygen in the range of about $10^{-6}$ to $10^{-10}$ have stable vanadium oxidation states that vary in the range of about +3 to +5.

The pellets of the composition involving FeO—$V_2O_3$—CaO may be used as an oxidation of reduction catalyst in the conventional catalytic oxidation or reduction of a reactant material. For example, the compositions may be used for the catalytic oxidation of an organic material or for the catalytic reduction of an oxygen containing gas. They offer improved activity and yields and greater stability over a wider temperature range e.g. about 900° C. or higher than that which is offered by typical oxidation catalysts. For example, as an oxidation catalyst the subject pellets may be used in the conversion of o-xylene to phthalic anhydride, butene to maleic anhydride, or alcohols to aldehydes or organic acids. As a reduction catalyst, these pellets may be used to reduce the oxides of nitrogen to nitrogen.

As previously noted, the newly synthesised solid compositions involving $FeO-V_2O_3-CaO$ contain vanadium in many different oxidation states. This is important for the oxidation-reduction catalysts described above. In addition, they are stable (solids) at relatively high temperatures. The CaO and FeO may moderate the acidity and make these materials selective oxidation or reduction catalysts.

Various modifications of the invention as herein before set forth may be made without departing from the spirit and scope thereof, and therefore, only such limitations should be made as are indicated in the appended claims.

We claim:

1. A composition comprising FeO, $V_2O_3$ and CaO wherein said composition falls within polygon DEFG as shown in the disclosed Figure; wherein the amounts of FeO, $V_2O_3$ and CaO are characterized as shown in the table below;

| Vertices | Coordinates (wt %) | | |
| --- | --- | --- | --- |
| | FeO | $V_2O_3$ | CaO |
| D | 1 | 30 | 69 |
| E | 45 | 30 | 25 |
| F | 45 | 54 | 1 |
| G | 1 | 98 | 1 |

2. A composition as provided in claim 1 wherein said composition falls within triangle PQG.

3. A composition as provided in claim 1 and as illustrated by point H in said disclosed Figure, wherein said composition has the following coordinates in wt. % FeO 15, $V_2O_3$ 70, and CaO 15.

4. A composition as provided in claim 1, wherein said composition falls within polygon RSTU.

5. A composition as provided in claim 1 and as illustrated by point K in said disclosed Figure, wherein said composition has the following coordinates in wt. %: FeO 15, $V_2O_3$ 57, and CaO 28.

6. A composition as provided in claim 1, wherein said composition exists within polygon DVXSR.

7. A composition as provided in claim 1 and as illustrated by point L in said disclosed Figure, wherein said composition has the following coordinates in wt. % FeO 17, $V_2O_3$ 50, and CaO 33.

8. A composition as provided in claim 1 wherein said composition is a solid solution.

9. Composition comprising FeO, $V_2O_3$ and CaO wherein the oxidation state of the vanadium in said composition is in the range of about +3 to +5 and wherein said composition is characterized by its ability to catalyze oxidation-reduction reactions and said composition falls within polygon DEFG as shown in the disclosed Figure wherein the amounts of FeO, $V_2O_3$ and CaO are characterized as shown in the table below:

| Vertices | Coordinates (Wt %) | | |
| --- | --- | --- | --- |
| | FeO | $V_2O_3$ | CaO |
| D | 1 | 30 | 69 |
| E | 45 | 30 | 25 |
| F | 45 | 54 | 1 |
| G | 1 | 98 | 1 |

10. A method of preparing a composition comprising FeO, $V_2O_3$ and CaO wherein said composition falls within polygon DEFG as shown in the disclosed Figure, and wherein said method comprises the steps of:

(1) heating $V_2O_5$ powder having a particle size of less than about 50 microns in an atmosphere in which the partial pressure of oxygen is in the range of $10^{-6}$ to $10^{-10}$ atmospheres while starting at a temperature of about 600° C. and gradually increasing the temperature over a period in the range of about 12 to 24 hours to about 1300° C. and holding the temperature at about 1300° C. for a period to ensure complete reduction of all vanadium to $V^{3+}$;

(2) heating $Fe_2O_3$ powder having a particle size of less than about 50 microns for a period of about 10 to 14 hrs at a temperature in the range of about 1400° C. to 1450° C. whereby substantially all of said $Fe_2O_3$ is converted into $Fe_3O_4$;

(3) heating $CaCO_3$ powder having a particle size of less than about 50 microns for a period of about 10 to 14 hrs at a temperature in the range of about 600° C. to 1100° C.; whereby substantially all of said $CaCO_3$ is converted into CaO;

(4) thoroughly grinding together about 30 to 98 wt. % of $V_2O_3$ from (1), with about 1 to 45 wt. % of $Fe_3O_4$ from (2), and about 1 to 69 wt. % of CaO from (3) to produce a mixture having a grain size of less than about 50 microns;

(5) pelletizing the mixture from (4) at a pressure of about 5000 psi; and (6) heating and reacting together the mixture of pellets from (5) at a temperature in the range of about 700° C. to 1500° C. for a period in the range of about 12 to 48 hrs in an atmosphere in which the partial pressure of oxygen is in the range of $10^{-10}$ to $10^{-6}$ atmosphere.

11. The method of claim 10 where in said Figure the amounts of FeO, $V_2O_3$ and CaO characterized as shown in the Table below;

| Vertices | Coordinates (wt %) | | |
| --- | --- | --- | --- |
| | FeO | $V_2O_3$ | CaO |
| D | 1 | 30 | 69 |
| E | 45 | 30 | 25 |
| F | 45 | 54 | 1 |
| G | 1 | 98 | 1 |

12. The method of claim 10 further comprising the steps of cooling the pellets from (6) to ambient temperature, while at substantially the same partial pressure of oxygen as in (6); and storing the cooled pellets in a sealed container.

13. The method of claim 10 wherein said composition is a solid solution.

14. The method of claim 10 wherein at the time of reaction in (6) all of the oxide pellets from (5) are in the solid state or at least one, two or three of the oxide constituents are in the molten state.

15. The method of claim 10 where in step (1) said $V_2O_5$ powder is heated in an atmosphere involving a gas mixture of $CO_2$ and $H_2$ with a volume ratio of $CO_2/H_2$ in the range of about 10/1 to 1/1.

16. The method of claim 10 wherein the heating steps (1) and (6) takes place in an atmosphere involving a gas mixture of $CO_2$ and $H_2$ with a volume ratio of $CO_2/H_2$ in the range of about 10/1 to 1/1.

17. The method of claim 10 wherein the heating steps (1) and (6) take place in an atmosphere involving a gas mixture of $CO_2$ and $CO$ or $H_2O$ and $H_2$ in volumetric ratios $CO_2/CO$ or $H_2O/H_2$ in the range of about 10/1 to 1/1.

18. The method of claim 10, wherein said composition falls within triangle PQG.

19. The method of claim 10 wherein said composition is illustrated by point H in said disclosed Figure, wherein said composition has the following coordinates in wt. %: FeO 15, $V_2O_3$ 70, and CaO 15.

20. The method of claim 10 wherein said composition falls within polygon RSTU.

21. The method of claim 10 wherein said composition is illustrated by point K in said disclosed Figure, wherein said composition has the following coordinates in wt. % FeO 15, $V_2O_3$ 57, and CaO 28.

22. The method of claim 10 wherein said composition falls within polygon DVXSR.

23. The method of claim 10 wherein said composition is illustrated by point L in said disclosed Figure, wherein said composition has the following coordinates in wt. %: FeO 17, $V_2O_3$ 50, and CaO 33.

* * * * *